United States Patent
DeMeuse

(10) Patent No.: US 6,953,617 B2
(45) Date of Patent: Oct. 11, 2005

(54) HIGH OTR FILMS MADE FROM HOMOPOLYMER POLYPROPYLENE AND 1-BUTENE/ETHYLENE COPOLYMER BLENDS

(75) Inventor: Mark DeMeuse, Charlotte, NC (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 95 days.

(21) Appl. No.: 10/437,484

(22) Filed: May 14, 2003

(65) Prior Publication Data

US 2004/0229064 A1 Nov. 18, 2004

(51) Int. Cl.$^7$ .......................... B32B 27/32; C08L 23/10
(52) U.S. Cl. ................... 428/195.1; 428/343; 428/352; 428/515; 428/516; 428/523; 428/910; 525/240
(58) Field of Search ................ 428/34.3, 252, 428/515, 516, 523, 195.1, 910; 525/240

(56) References Cited

U.S. PATENT DOCUMENTS

| | | | |
|---|---|---|---|
| 3,634,552 A | | 1/1972 | Foglia et al. |
| 3,808,304 A | | 4/1974 | Schimer |
| 3,849,520 A | | 11/1974 | Bullard et al. |
| 4,075,290 A | | 2/1978 | Denzel et al. |
| 4,311,571 A | | 1/1982 | Mack |
| 4,354,004 A | | 10/1982 | Hughes et al. |
| 4,359,544 A | * | 11/1982 | Hwo et al. .................. 524/232 |
| 4,410,582 A | | 10/1983 | Tsunashima et al. |
| 4,554,321 A | | 11/1985 | Hwo et al. |
| 4,734,459 A | * | 3/1988 | Cecchin et al. ............. 525/247 |
| 4,826,909 A | * | 5/1989 | Lakshmanan et al. ...... 524/478 |
| 4,842,875 A | | 6/1989 | Anderson |
| 4,960,820 A | | 10/1990 | Hwo |
| 5,369,181 A | | 11/1994 | Hwo |
| H001583 H | * | 8/1996 | Hwo et al. ................ 526/348.6 |
| 5,763,534 A | | 6/1998 | Srinivasan et al. |
| 5,985,971 A | | 11/1999 | Srinivasan et al. |
| 5,998,524 A | | 12/1999 | Srinivasan et al. |
| 6,180,720 B1 | * | 1/2001 | Collina et al. .............. 525/191 |
| 6,231,936 B1 | | 5/2001 | Kozimor et al. |
| 6,232,402 B1 | | 5/2001 | Demeuse |
| 6,262,402 B1 | | 5/2001 | DeMeuse |
| 6,306,996 B1 | * | 10/2001 | Cecchin et al. ........... 526/348.6 |
| 6,410,136 B1 | * | 6/2002 | DeMeuse .................... 428/347 |
| 6,436,494 B2 | * | 8/2002 | Tanaka et al. ............. 428/34.3 |
| 6,485,817 B1 | | 11/2002 | DeMeuse |
| 6,514,625 B1 | | 2/2003 | DeMeuse |
| 6,686,055 B2 | * | 2/2004 | Tanaka et al. .............. 428/516 |

FOREIGN PATENT DOCUMENTS

| | | |
|---|---|---|
| EP | 0 323 629 A2 | 7/1989 |
| EP | 0 243 965 | 3/1992 |
| WO | WO 95/26269 | 10/1995 |
| WO | WO 00/12306 A2 | 3/2000 |

OTHER PUBLICATIONS http://www.basell.com/portal/site/basell/index.jsp?epicontent=GENERIC&brochure_start_doc=0&epi_menuItemID=483732eb15b68bdf5305285a0f034a0&displayproperty03=6580&displayproperty02=6680&displayproperty01=6280&query=1600SA&staticontent_title_sort_order=&se Basell.com web link (date 2003).*

* cited by examiner

*Primary Examiner*—D. Lawrence Tarazano
(74) *Attorney, Agent, or Firm*—Caesar, Rivise, Bernstein, Cohen & Pokotilow, Ltd.

(57) ABSTRACT

A polyolefin blend having in a range of 40 to less than 90% by weight of a high modulus, isotactic polypropylene; and in a range of 10 to 60% by weight of a 1-butene/ethylene copolymer; the 1-butene/ethylene copolymer having about 0.5 to about 10 wt % of an ethylene. A polyolefin blend can be in a form of a transparent, oriented film having a biaxially oriented layer with an oxygen transmission rate of at least about 200 cc/100 sq. in./day/atmosphere (3077 cc/sq. m./24h/atmosphere), a tensile modulus of at least about 160,000 psi (1.103 GPa) and a haze value of no greater than about 3% measured at a thickness of about 1 mil (25 μm).

16 Claims, No Drawings

HIGH OTR FILMS MADE FROM HOMOPOLYMER POLYPROPYLENE AND 1-BUTENE/ETHYLENE COPOLYMER BLENDS

BACKGROUND OF THE INVENTION

This invention relates to polyolefin films having certain unique properties. Specifically, it relates to clear polyolefin films that exhibit an increased oxygen transmission rate as compared to conventional polypropylene films known to the art.

It is known that, for many applications, particularly packaging applications, polypropylene is less than totally satisfactory due to a relatively high permeability to oxygen. A great amount of effort has been expended in recent years to decrease the oxygen transmission characteristics of polypropylene. The best results to date have been obtained by metallization of the films.

There are, however, some applications in which a greater and controllable oxygen transmission rate is desired. This is particularly the case when fresh fruits, vegetables and flowers are to be packaged as these products continue to respire after they are packaged. Absence or insufficient levels of oxygen occurs as the oxygen originally present in the package is consumed, which leads to premature senescence and spoilage of the products. At the same time, respiration leads to a build-up of moisture in the package, which also can lead to spoilage of the product if the moisture cannot escape from the package. It is, thus, desirable to provide polypropylene packaging films in which the oxygen content can be replenished as necessary and from which the moisture can escape.

Conventional polypropylene films of a thickness required for most applications, whether monolayer or multilayer structures, have oxygen and moisture vapor permeability values that are not sufficient to allow the optimum oxygen and moisture levels to be maintained in a sealed package containing products of the type mentioned in the preceding paragraph.

One of the difficulties that typically arises in the design of films for use in the fresh cut produce packaging area is that in order to achieve progressively higher oxygen transmission rates (OTRs), the film stiffness or its tensile modulus normally decreases. For example, an oriented polypropylene (OPP) film has a higher modulus than a polyethylene (PE) film, but the OTR of the OPP film is significantly less than for the PE film of identical thickness. Due to the lower than desired OTR, OPP films have limited applicability in the packaging of various fresh-cut produce items.

It is known to prepare microporous films based on an opaque polymer mixture comprised of about 45% to 55% of a polypropylene homopolymer and 55% to 45% of a copolymer of propylene and ethylene containing about 2% to 5% ethylene by weight, which films have greater oxygen permeability than films made of polypropylene homopolymer alone. This polymer mixture is blended into a mixture comprised of about 40 to 60% of the polymer mixture and 60 to 40% of certain inorganic filler materials and is subjected to biaxial orientation. The filler material selected is one that causes voiding of the polymer matrix during the drawing operation. Exemplary of such voiding pigments are barium sulfate, calcium carbonate, silica, diatomaceous earth and titania, wherein calcium carbonate is the preferred filler material. U.S. Pat. No. 4,842,875 to Anderson teaches the use of such films in the preparation of controlled atmosphere containers for use with fresh vegetables, fruits and flowers.

Microporous films of the above described type function reasonably well having increased and, to a degree, controlled oxygen and moisture vapor permeability. However, the voiding pigments employed in the prior art are of a particle size large enough and are employed in concentrations great enough to result in formation of voids of such a size that the resultant films are almost totally opaque. Such opaque films are not suitable for many applications, such as in the packaging of fresh fruits and vegetables in which transparency is desired or required.

Polyethylene films also are known to have sufficiently great oxygen transmission qualities to permit produce items to continue respiring after being packaged without premature senescence and spoilage of such items. However, polyethylene films do not have a desired tensile modulus or optical properties for use in many packaging applications.

It is known in the prior art to mix polypropylene with other polymers to improve certain characteristics of plastic films.

U.S. Pat. No. 3,808,304 to Schirmer is directed to oriented blends of polypropylene and poly(1-butene) with improved heat shrinkablility.

U.S. Pat. No. 4,075,290 to Denzel et al. is directed to heat-sealable poly(1-butene) blends with an improved welding strength, the blends consisting essentially of 80–99% by weight of isotactic poly(1-butene) and copolymers of ethylene with propylene or 1-butene. Other blends consist essentially of 85–99% by weight of isotactic poly(1-butene) and isotactic polypropylene.

U.S. Pat. No. 4,311,571 to Mack describes a method of accelerating poly(1-butene) phase transformation to a stable type I polymorph in the presence of olefinic comonomers such as ethylene, polypropylene, 1-butene, etc., wherein poly(1-butene) is a predominant component.

U.S. Pat. No. 4,354,004 to Hughes et al. is directed to a film made from a composition consisting essentially of a blend of 90–98% of isotactic 1-butene-ethylene copolymer containing 0.5–10 wt % of ethylene, 2–9% of isotactic polypropylene homopolymer, and 0.02–1.5% of high density polyethylene, wherein the amount of polypropylene is critical.

U.S. Pat. No. 4,554,321 to Hwo et al. is directed to a film made from a composition consisting essentially of a blend of about 50–95% of isotactic 1-butene/ethylene copolymer containing 0.510 mole % of ethylene, from 50 to 5 wt % of stereoregular elastomeric polymer of 1-butene, and 2–9% of isotactic polypropylene.

U.S. Pat. No. 4,960,820 to Hwo is directed to a blend having 10% or less of a low molecular weight (150,000 or less), high melt index (100–1000), isotactic poly(1-butene) with 90% of polypropylene. In a preferred embodiment, the poly(1-butene) is a copolymer containing 1–30 wt % of ethylene or propylene.

Thermoplastic polypropylene blends with mixtures of copolymer elastomers of ethylene/butene and ethylene/octene are described by Srinivasan et al. in U.S. Pat. Nos. 5,763,534, 5,985,971, and 5,998,524. Polypropylene polymers disclosed by Srinivasan et al. have a melt flow rate (MFR) of about 10 to 80 dg/min. Ethylene/butene (EB) copolymers include ethylene in an amount of 5–95% and preferably about 50–90%. The resulting polymers have a MFR of at least 10 dg/min and can be used for molding or for mixing with paints to improve adherence.

U.S. Pat. No. 6,231,936 B to Kozimor et al. discloses a radiation tolerant polymeric blend containing polypropylene and a polymer produced by a single site catalysis (SSC-polymer), wherein the SSC-polymer comprises about 1–50% by weight of the blend. Examples 23–32 in Table 4B show blends of polypropylene having a MFR of 25 dg/min with SSC-produced ethylene-butene copolymers. However, the blends of polypropylene with ethylene-butene copolymers in this invention have a high haze (12.7–29.0%, Tables 4A–4B, column 14).

The patents discussed above do not disclose OTR values of resulting polymeric films by themselves or in relation to the film's tensile modulus and optical properties, e.g., haze and clarity.

U.S. Pat. No. 4,410,582 to Tsunashima et al. is directed to finger-tearable, multilayer structures usable as an adhesive tape substrate and in other applications. Although, this patent discloses the use of a nucleated polypropylene in the skin, the disclosed purpose of adding the nucleating agent is to improve the transparency of the film. There is no disclosure of providing a nucleated polypropylene having any required properties for improving the OTR of the film, let alone providing the high modulus properties required in the instant invention. In fact, there is no disclosure that controlling the tensile modulus properties of the polypropylene in the skin has any effect on the OTR. It is stated in column 8, lines 15–20 that the substrate may be usable as a packaging film if a paper or metal foil is bonded to one or both surfaces. However, employing a metallized or paper layer tends to reduce the OTR of the film and renders it opaque; thereby, making the film undesirable for packaging applications in which a high OTR and a low haze is required or desired.

European publication No. 0 243 965, describing an invention by Tsutomu, et al., discloses a multilayer packaging film for packaging fresh vegetables and fruits and including an antifogging additive in at least one surface layer that also has heat sealing properties. Also, the base layer of the antifogging multilayer film must contain, in addition to the homopolymer or copolymer of alpha-olefins, 10–70% of a polymer selected from the group consisting of vinyl acetate, acrylic acid and styrene (see page 8).

WO 95/26269 by Kuo discloses an oxygen-permeable multilayer film with an oxygen transmission rate of 500–50,000 cc/m$^2$/24h STP, wherein an outer layer of the film consists of a homogeneous ethylene/$\alpha$-olefin copolymer and has a density of 0.915 g/cc or less. The $\alpha$-olefin is a $C_3$–$C_{20}$ $\alpha$-olefin, preferably 1-butene. A second (core) layer is used to provide a desired tensile strength to the film and comprises a polypropylene/ethylene copolymer.

The following patents by the applicant herein relate to a search for a film with satisfactory OTR and tensile modulus values for use in packaging produce, flowers and the like. U.S. Pat. No. 6,232,402 relates to films based on a three component polyolefin blend and discloses a monolayer or a coextruded, multilayer film made from a blend of 75–92% of a high modulus, isotactic polypropylene (PP) homopolymer, 5–15% of a low density polyethylene (LDPE) (0.915–0.935 g/cc) and 310% of a heteropolymer containing polypropylene and at least one other 2 to 4 carbon a-olefin, wherein the heteropolymer is a copolymer or a terpolymer. In a preferred embodiment, films made from these blends exhibit an OTR of at least 200 cc/100 sq.in./day/atm, a tensile modulus of at least 195 kpsi and a haze value of no greater than 4%.

International publication WO 0012306A2 to DeMeuse and corresponding U.S. Pat. Nos. 6,485,817 and 6,514,625 disclose monolayer and multilayer polyolefin films. These references disclose a polyolefin film comprised of a blend consisting essentially of 10–75% by weight of a high modulus, isotactic polypropylene and 25–90% by weight of a heteropolymer consisting of at least two $\alpha$-monoolefins. In a preferred embodiment, the heteropolymer is selected from the group consisting of a copolymer of ethylene and polypropylene containing about 4.5 to 6% ethylene by weight, a copolymer of polypropylene and 1-butene containing about 5 to 34% 1-butene by weight and a terpolymer of ethylene, polypropylene and 1-butene.

The range of uses for packaging of fresh produce that an oriented polypropylene (OPP) film can provide has recently been extended through the production of films based on blends of a high tacticity homopolymer polypropylene with propylene/ethylene copolymers. Specifically, a 75/25 blend of a propylene/ethylene copolymer containing 4% ethylene (Fina 8573 from ATOFINA (Deer Park, Tex.)) with a high tacticity polypropylene homopolymer (Amoco Accpro 9117 from BP Amoco (Alpharetta, Ga.)) has been shown to yield a film with an OTR at 1 mil thickness of about 190 cc/100 sq.in./day/atm and a machine direction tensile modulus of about 240,000 psi. The OTR value obtained is approximately twice that obtained with an OPP film based on homopolymer alone. In the film produced from the blend, the propylene/ethylene copolymer (Fina 8573) component provides the high OTR to the film, while the high tacticity homopolymer (Amoco Accpro 9117) component provides the required or desired stiffness.

However, the observed trend is that if the amount of the propylene/ethylene copolymer (Fina 8573) is increased in the blend to increase the OTR, the tensile modulus of the resulting film is reduced. Similarly, if the amount of the propylene/ethylene copolymer (Fina 8573) is decreased, the tensile modulus of the resulting film increases, but with a decrease in the film's OTR. If copolymers, which contain either more or less than 4% ethylene are used in blends with polypropylene homopolymer, the same correlation of increase/decrease between OTR and tensile modulus values is observed.

Thus, the prior art films exhibit a problem in that, although the films made from blends of propylene/ethylene copolymers with high tacticity homopolymer polypropylene have OTR values approximately twice that of a conventional OPP film, they do so at the expense of the films' tensile modulus and/or haze. Such negative correlation between the film's OTR and tensile modulus is likely to create complications in production and handling of the final film. Therefore, a need exists for a film having higher OTR, low haze (below 4%) and improved tensile modulus values. Also, there is a need to produce a film having higher OTR and low haze with similar tensile modulus values as the film based on the propylene/ethylene copolymer blends with the high tacticity homopolymer polypropylene. Further, there is a need for a film having similar OTR values as the film based on the blends of the propylene/ethylene copolymer with the high tacticity homopolymer polypropylene, but with higher tensile modulus and low haze.

The current invention provides a unique and desired balance among OTR, tensile modulus, and optical properties in packaging films. As will be discussed in greater details hereafter, the inventor obtained unexpected results by blending a high modulus polypropylene with 1-butene/ethylene copolymers.

It is an object of this invention to provide polyolefin compositions and films based on blends of polypropylene and copolymers of 1-butene with ethylene that have a desired balance of properties required to be useful in modified atmosphere packaging applications for packaging fresh vegetables, fruits, flowers and the like.

All references cited anywhere in this application are incorporated herein by reference in their entireties.

BRIEF SUMMARY OF THE INVENTION

Polyolefin blends in accordance with this invention include a high modulus, isotactic polypropylene and a 1-butene/ethylene copolymer. The high modulus, isotactic polypropylene is in a range of 40 to less than 90% by weight of the blend, preferably 40 to 75% by weight of the blend, and more preferably about 60 to less than 75% by weight of the blend. The 1-butene/ethylene copolymer is about 10 to about 60% by weight of the blend, preferably 25–60%, more preferably 2540% by weight of the blend, wherein the 1-butene/ethylene copolymer has about 0.5 to about 10% by weight of ethylene.

The polypropylene employed in the present invention has an isotactic index of at least about 90%, preferably at least about 92%, and more preferably in a range of at about 93% to about 98%, and a melt flow rate of about 1 to about 10 dg/min, and more preferably about 2 to about 3.5 dg/min as measured by ASTM D1238, Condition L.

The 1-butene/ethylene copolymer employed in the present invention has a melt index of about 2 to about 45 dg/min as measured by ASTM D1238, Condition E. The blends of the present invention can further comprise a polyethylene in the amount up to about 20% by weight of the blend and preferably about 5 to about 10%.

The present invention also includes a transparent, oriented film made from the blends of the present invention described above; the film comprising at least one layer, wherein the layer has an oxygen transmission rate of at least about 200 cc/100 sq. in./day/atmosphere (3077 cc/sq. m./24h/ atmosphere), a tensile modulus of at least about 160,000 psi (1.103 GPa), preferably at least about 180,000 psi (1.241 GPa), and a haze value of no greater than about 3%, and wherein the oxygen transmission rate, the tensile modulus and the haze are measured at a thickness of about 1 mil (25 $\mu$m).

In one preferred embodiment, the film of the present invention is a single layer self-supporting structure. This film is about 0.5 to about 1.0 mil (13 and 25 $\mu$m) thick and more preferably about 0.5 to about 0.8 mil (13 and 20 $\mu$m) thick.

DETAILED DESCRIPTION OF THE INVENTION

The present invention involves polyolefin blends of a high modulus polypropylene and a 1-butene/ethylene copolymer and films based on polyolefin blends of a high modulus polypropylene and a 1-butene/ethylene copolymer.

In accordance with this invention, it has been discovered that by blending certain amounts of high modulus polypropylene and 1-butene/ethylene copolymers, packaging films can be formed with a more desired balance of oxygen transmission rate (OTR), tensile modulus and optical properties e.g., haze than has heretofore been achieved with prior art compositions, e.g., the resulting film of this invention can have improved OTR without significant reduction in tensile modulus and haze.

In addition, using 1-butene/ethylene copolymers instead of ethylene/propylene copolymers in a blend with high modulus polypropylene allows preparing films with more desirable properties in a more economical way because the blends of the present invention require using smaller amounts of a copolymer, which is the most expensive component of the blend.

It has been discovered that by blending high modulus polypropylene in a range of 40 to less than 90% by weight of the blend, preferably in a range of 40 to 75%, more preferably about 60 to less than 75% by weight of the blend having a MFR of about 1–10 dg/min, preferably 2–3.5 dg/min, with 1-butene/ethylene copolymers in a range of 10 to. 60%, preferably 25–60%, more preferably 2540% by weight of the blend, wherein the ethylene content is 0.5–10 wt %, and preferably 0.56 wt %, and wherein the MI of the 1-butene/ethylene copolymers is about 2–45 dg/min, a composition is created for extrusion into an oriented film having an OTR value of higher than about 200 cc./100 sq.in./day/ atm at 1 mil thickness, a tensile modulus higher than about 160,000 psi, preferably higher than about 180,000 psi, and a haze below 3%.

Also, the composition of the present invention can further contain up to 20 wt % of a metallocene linear low-density polyethylene (mLLDPE) resin, which has a density of about 0.9 to about 0.92 g/cc.

The films of the present invention based on blends of the high modulus polypropylene homopolymer, preferably BP Amoco Accpro 9117 or Sunoco FF035C, with 1-butene/ ethylene copolymers offer advantages e.g., a better balance of properties such as oxygen transmission rate (OTR), tensile modulus, and haze, when the films are compared to films based on propylene/ethylene copolymer blends with a high modulus polypropylene homopolymer and other films of the prior art.

In the following discussion, gas permeability properties of the films of the invention will be discussed in terms of their OTR. In addition, carbon dioxide transmission rate is an important parameter of these films, affecting their utility as packaging materials for fresh produce items, since carbon dioxide also is generated as the product continues to respire. Carbon dioxide transmission rates can be estimated using the generally accepted factor of a weight ratio of carbon dioxide to oxygen transmitted per unit of time of about 4 to 1.

When used in this disclosure the term "$C_2/C_4$ copolymer" refers to a 1-butene/ethylene copolymer and the term "$C_2/C_3$ copolymer" refers to a propylene/ethylene copolymer.

When used in this disclosure, the term "polyolefin" refers to a linear unsaturated hydrocarbon polymer originated from monomers also called "α-olefins" having one carbon— carbon double bond, which double bond is located at the end of the linear chain in the 1-position.

Reference to "high modulus polypropylene" means a polypropylene homopolymer or a polypropylene composition, wherein the composition could include a mixture of polypropylene homopolymer with other additives, polymeric or otherwise in an amount that does not destroy or adversely affect the crystallinity of the polypropylene of this invention. When formed into a 70 gauge (0.7 mil thick) film drawn 7×by 7×on simultaneous draw equipment, the high modulus polypropylene of this invention (which includes mini-random copolymers having a low wt percent of another α-olefin, e.g., ethylene) provides the film with a tensile modulus value of at least about 450,000 psi in both the machine direction and cross-machine direction of the film.

The preferred high modulus polypropylene in this invention is a polypropylene homopolymer having a melt flow rate (MFR) in the range of about 1–10 dg/minute, as measured by ASTM D1238, Condition L, and the most preferred high modulus polypropylene is a polypropylene homopolymer having the MFR in the range of about 2–3.5 dg/minute. Such a homopolymer is extremely well suited for the production of oriented films in accordance with this invention.

Suitable and preferred polypropylenes, which exhibit the required high modulus characteristics, include high crystallinity polypropylenes. These materials, available under several trade names, have an isotactic index of at least about 90%, preferably at least about 92%, and more preferably in a range of at about 93% to about 98%. The isotactic index in accordance with this invention is determined by dissolution in xylene, i.e., the polymer contains no more than about 7%, and preferably no more than about 2 to 6% xylene soluble materials. Typical high crystallinity polypropylene is further characterized by higher stiffness, greater surface hardness, lower heat deflection at high temperatures, lower heat shrinkage and better creep properties than conventional isotactic polypropylenes, which have an isotactic index generally less than 90%. Typical high crystallinity polypropylenes that can be employed in the present invention include ACCPRO 9117, ACCPRO 9119 and ACCPRO 9218 (available from BP Amoco Polymers, Alpharetta, Ga.); Chisso HF 5010 and Chisso XF 2805 (available from Chisso Chemical Co. Ltd., Tokyo, Japan) and FF035C, a nucleated isotactic polypropylene (available from Sunoco Co., Pittsburgh, Pa.).

High modulus polypropylenes also include blends of conventional isotactic polypropylene with low molecular weight hydrocarbon resins. Inclusion of about 5% or more of the low molecular weight hydrocarbon resin in a conventional polypropylene increases the tensile modulus to the desired high modulus range. The upper limit of low molecular weight resin is about 25% by weight.

The low molecular weight hydrocarbon resins are hydrogenated or unhydrogenated resins derived from olefin monomers, such as the resins derived from terpene monomers, coal tar fractions and petroleum feedstocks. In general, the low molecular weight resins are characterized by a molecular weight less than about 5000, a glass transition temperature (T) of about 50° C. to 100° C., and a softening point less than about 140° C. Suitable resins include those prepared from terpene monomers (e.g., limonene, alpha and beta pinene, such as Piccolyte resins from Hercules Incorporated, (Wilmington, Del.) and Zonatac resins from Arizona Chemical Company (Panama City, Fla.)). Other low molecular weight resins are prepared from hydrocarbon monomers and mixtures thereof, such as $C_5$ monomers (e.g., piperylene, cyclopentene, cyclopentadiene, and isoprene), oligomerized $C_5$ monomers, particularly the thermally oligomerized $C_6$ monomers such as the hydrogenated thermally oligomerized cyclopentadiene resins sold under the trade name Escorez (e.g., Escorez 5300) by Exxon Chemical Co. (Baytown, Tex.). Others are prepared from $C_9$ monomers, particularly the monomers derived from $C_9$ petroleum fractions which are mixtures of aromatics, including styrene, methyl styrene, alpha methyl styrene, vinyl naphthalene, indenes and methyl indenes, and, additionally, pure aromatic monomers, including styrene, α-methylstyrene and vinyltoluene. Examples of these resins include hydrogenated α-methyl styrene-vinyl toluene resins sold under the trade name Regalrez by Hercules Incorporated of Wilmington, Del. The hydrogenated $C_9$ and pure monomer resins are preferred. Particularly preferred are the hydrogenated cyclopentadiene resins and the hydrogenated aromatic resins derived from pure aromatic monomers, e.g., the hydrogenated α-methyl styrene-vinyltoluene copolymers.

Another polypropylene having the high modulus required for use in this invention can be prepared by blending conventional commercial isotactic polypropylene prepared via Ziegler-Natta catalysis with a polypropylene prepared by use of a metallocene catalyst. Such blends and films prepared therewith are described in U.S. Pat. No. 6,268,062 by DeMeuse.

Reference to lower modulus polypropylene means a polypropylene homopolymer or a polypropylene composition with an Isotactic index of below 90%. 1-butene/ethylene copolymers of this invention have a melt index (MI) of about 2–45 dg/min, as measured by ASTM D1238, Condition E, and comprise about 0.5–10 wt % of ethylene, and preferably comprise about 0.5–6 wt % of ethylene.

Reference to "low density polyethylene" usable in this invention refers to a polyethylene species having a density no greater than about 0.935 gm/cc and preferably between about 0.915 gm/cc and 0.935 gm/cc. The term "polyethylene species" includes not only polyethylene homopolymers but also copolymers of ethylene with other olefin monomers, e.g., octene. By contrast, high density polyethylene, which is widely used in the film art for preparing polyethylene film, has a density on the order of 0.95–0.97 gm/cc.

Low density polyethylenes (LDPEs) are known, commercially available materials. These polymers can be ethylene homopolymers or they can be copolymers of ethylene with a linear alpha-monoolefin having 4 to 8 carbon atoms in which the ethylene predominates. Such copolymers also are referred to in the art as low density polyethylenes (LDPE).

The addition of LDPE, preferably a low-density polyethylene homopolymer, to a blend including a high modulus, isotactic polypropylene and a 1-butene/ethylene copolymer is contemplated in this invention. In the preferred embodiment, LDPE homopolymer is added in an amount up to about 20% by weight, and more preferably between about 5 to about 10%.

It also is within the scope of the invention to employ linear low-density polyethylene copolymers, preferably a metallocene catalyzed linear low-density polyethylene (mLLDPE) resin having a density of 0.9–0.92 gm/cc and a melting temperature range of 83–102° C. The use of the mLLDPE resin, which is a copolymer, improves optical properties of the resulting film, i.e. it lowers the haze as compared to the addition of other LDPEs. Typical of commercially known mLLDPE is EXCEED 350D60 (ExxonMobil Chemical Co., Houston, Tex.), which is a hexene copolymer produced using ExxonMobil's EXXPOL® technology.

The term "self-supporting" In reference to a film or core layer means that the film or core layer can support itself without the aid of any additional supporting layers to provide the necessary strength and body, and it can readily be handled without being adhered to another substrate. Such a film or core is sometimes referred to herein as a "standalone" film.

The term "transparent", or "low haze" when employed in connection with the films of this invention, means a film having a haze value less than about 3% as measured in accordance with ASTM D-1003 using a Gardner Haze Meter.

Film forming and drawing to effect biaxial orientation can be carried out by conventional commercial techniques, e.g., the well known tubular (bubble) process or the equally well known tenter process can be employed as described in U.S. Pat. No. 6,232,402 to DeMeuse. When the films are prepared by the tubular process, the draw is effected simultaneously and uniformly in the machine and cross directions to between about 3x to 7x and preferably between about 5x to 7x. Using the tenter process, drawing is carried out sequentially to between about 3x to 7x in the machine direction and to between about 7x to 11x in the cross direction.

Films according to the invention that exhibit the desired high OTR value can be either monolayer or coextruded, multilayer films. In multilayer film structures in accordance with this invention, the blend of a polypropylene homopolymer with a 1-butene/ethylene copolymer is in a core layer, and the structure includes a functional skin layer on either or both of its surfaces. The skin layers employed in this invention preferably have an OTR greater than that of the core. In either the monolayer or multilayer embodiment, the films are generally of a thickness from about 0.5 to about 1.0 mil and, preferably, from about 0.5 to about 0.8 mil. In multilayer structures of this invention, the core layer preferably constitutes over 50% of the structure of the film, with the skin layers being quite thin. For example, in a 70 gauge (0.7 mil) three-layer structure of the present invention, the core layer can be 64–65 gauge (0.64–0.65 mil), with the total or combined thickness of the opposed skin layers being 5–6 gauge (0.05–0.06 mil).

A variety of different functional layers can be employed as the skin layer in accordance with the invention. For example, one functional layer can be a heat seal layer. Such a layer has a lower melting point than the core layer, so that when heat is applied to effectuate the seal, the orientation of the core layer will not be signinficantly disturbed. A commonly used heat seal layer is a terpolymer of propylene, ethylene and 1-butene. The specific polymers employed in the heat seal layer do not constitute a limitation of the broadest aspects of this invention.

Another commonly used functional layer is a slip layer to facilitate handling of the film during later converting operations. Such a layer is comprised of a polymer containing a slip agent such as a high molecular weight fatty acid amide. A functional layer may also contain an antiblock additive to facilitate unwinding of the film after it has been wound at the terminus of the film manufacturing process.

Another commonly used functional layer is a printable skin layer. A printable skin layer can include a propylene/ethylene copolymer that is treated with an oxidative medium to create polar sites on the surfaces thereof and thus make the surfaces printable. A preferred oxidative medium is corona discharge. Another preferred oxidative technique is flame treatment. One skilled in the film art can readily determine the best treatment technique to use and the degree of oxidative treatment required for a particular application. The same type of skin layer also can function as a seal layer to adhere the film to other substances.

Preferred embodiments of multilayer films of this invention include, but are not limited to, a film structure wherein a first functional layer is a printable skin layer and a second functional layer is a slip skin layer, said skin layers being on opposite sides of a core layer that comprises the polymeric blends of the present invention. In another preferred embodiment, the second functional layer is a sealant skin layer.

To improve processability, from about 0.1 to about 1% by weight, and, preferably, about 0.2 to about 0.5% by weight, of an organic or inorganic antiblocking agent can be added to the outer layer or layers. Suitable antiblocking agents are, e.g., incompatible organic polymers such as polyesters and the like, or inorganic substances such as silicon dioxide and silicates. These materials are generally placed in the skin layer or layers of the film.

Typical slip agents are fatty acid amides. They generally can be classified as either primary amides, secondary amides or secondary bis-amides. Examples of primary amides include stearamide, oleamide and erucamide. Exemplary secondary amides that can be used include oleyl palmitamide and stearyl erucamide. Secondary bis-amides include ethylene bis-stearamide and ethylene bis-oleamide. The amides are usually used at concentration levels of 0.3% by weight or less. They may be contained in either the skin layer or the core layer.

The films according to the invention, in either the monolayer or the coextruded, multilayer embodiment can also be provided with a cold seal coating. Such a coating is typically a rubber adhesive applied to one of the surfaces of the film.

The invention is illustrated in greater details in the following Examples below, it being understood that the present invention is not deemed to be limited thereto.

Preparing Polyolefin Blends for Use in Films of the Invention

In the Examples that follow, pellets of the desired high modulus, isotactic polypropylene and 1-butene/ethylene copolymers were dry mixed in the desired ratios and melt blended in a Leistritz twin screw extruder (American Leistritz Extruder Corporation, Somerville, N.J.). Strands of the blended polymer mass were extruded into a water bath at room temperature to quench the molten polymer and the quenched strands were chopped into pellets.

Films were extruded through a single layer casting die onto a casting roll maintained at between about 75° C. and 80° C. at a casting speed of about 3.1 feet per minute (1.57 cm/sec).

All of the cast films were drawn 6x by 6x on a T. M. Long Stretcher (T. M. Long Corporation, Somerville, N.J.) and oriented at temperatures further specified in Tables 1 through 10.

These samples were prepared using the laboratory equipment and not on the commercial equipment. There might be a slight difference in OTR, tensile modulus and haze values for films produced by the laboratory or commercial equipment.

In the Examples below, the reported values of oxygen transmission rate, tensile modulus, and haze of samples are measured at a thickness of about 1 mil (25 µm).

EXAMPLES

Example 1

A series of polymer blends containing high modulus, isotactic polypropylene with poly(1-butene-ethylene) copolymers were prepared as indicated above using the laboratory equipment. The high modulus polypropylene employed was Sunoco FF035C, which is a nucleated polypropylene homopolymer with MFR of 3.5 dg/minutes. The 1-butene/ethylene copolymer was Basell DP8510, which contained 3.5 wt % ethylene by weight of the 1-butene/ethylene copolymer. This copolymer has a melt index (MI) of 45 dg/minutes.

These films were found to have the desired high OTR and modulus. Relevant test data are presented in Table 1. The data of the measured values are represented in the form of average values; standard deviations are shown in parenthesis.

TABLE 1

A Blend of a $C_2/C_4$ Copolymer with a High Modulus Polypropylene Sunoco FF035C[a]/Basell DP8510[b] (6 3.5 wt % ethylene)

| FF035C[a] wt. % | DP8510[b] wt. % | Orient. Temp.[c]; °C. | OTR[d]; cc/100 sq. in./day/atm | Tensile Modulus[e]; psi | Haze[f]; % |
|---|---|---|---|---|---|
| 60 | 40 | 145 | 358.6 (6.7) | 151938 (10280) | 1.18 (0.04) |
| 65 | 35 | 145 | 313.1 (3.0) | 162827 (9612) | 1.20 (0.06) |
| 70 | 30 | 145 | 264.8 (7.1) | 181730 (9090) | 0.98 (0.09) |
| 75 | 25 | 145 | 222.2 (2.6) | 236063 (7826) | 0.74 (0.02) |
| 90 | 10 | 150 | 146.9 (5.2) | 345336 (10989) | 0.69 (0.02) |

[a]Sunoco FF035C (Pittsburgh, PA) - a nucleated high isotactic PP homopolymer, MFR of 3.5 dg/minute;
[b]Basell DP8510 (Wilmington, DE) - a 1-butene/ethylene copolymer containing 6 3.5 wt % ethylene, MI of 45 dg/minute;
[c]Temperature at which films were oriented;
[d]OTR values are measured for a 1 mil thick film by ASTM D-3985-81 using an instrument designed specifically for high OTR films available from Mocon, Inc. Minneapolis, Minnesota;
[e]Samples were tested on an Instron unit; each sample had a width of 0.5 inches and a length of 2 inches; testing crosshead speed was 2 in./min; the tensile modulus was determined from the initial slope of the stress vs. strain curve;
[f]Haze was determined by ASTM D-1003 using a Gardner Haze Meter.

Results for films reported in the Table 1 are to be compared to a state of the art (prior art) film made from a 75/25 blend of a propylene/ethylene copolymer containing 4 wt % ethylene (Fina 8573) with a high tacticity polypropylene homopolymer (Amoco Accpro 9117), which has an OTR at 1 mil thickness of 190 cc/100 sq.in./day/atm and a tensile modulus of about 240,000 psi.

Thus, a film of this invention including a 75/25 blend of a nucleated high isotactic PP homopolymer (FF035C) with a 1-butene/ethylene copolymer containing 3.5 wt % ethylene (Basell DP8510) exhibits a higher OTR than that of the above identified prior art film and a very low haze at a comparable tensile modulus to the same prior art film.

Example 2

Film samples were prepared on a commercial scale equipment from blends of 25 wt % Sunoco FFO35C (a nucleated high isotactic PP homopolymer) with 75 wt % Fina 8573 (propylene/ethylene copolymer containing 4 wt % ethylene) and from 65 wt % Sunoco FF035C and 35 wt % Basell DP8510 (a 1-butene/ethylene copolymer containing 3.5 wt % ethylene) and tested for OTR, tensile modulus and haze values. Test data are presented in Table 2.

The data for the film made from 75 wt % Fina 8573/25 wt % Sunoco FF035C blend prepared on commercial equipment deviate from the data for the laboratory prepared prior art film of the same compositions, which yielded an OTR of 156 cc/100 sq. in./day/atm and a modulus of 189,000 psi as shown below in Table 9 in part because of differences in process conditions, i.e., orientation temperature and orientation level.

The data for the film made from 65 wt % Sunoco FF035C/35 wt % Basell DP8510 blend prepared on commercial equipment are consistent with the data for the laboratory prepared samples listed in Table 1. The slightly higher OTR of the laboratory prepared sample is consistent with the lower modulus.

TABLE 2

Comparative Samples Prepared on Commercial Scale Equipment

| Homopolymer wt. % | Copolymer wt. % | OTR[d]; cc/100 sq. in./day/atm | Tensile Modulus[e]; psi | Haze[f]; % |
|---|---|---|---|---|
| FF035C[a] 25 | Fina 8573[r] 75 | 177 | 259,000 | 2.5 |
| FF035C[a] 65 | DP8510[b] 35 | 282 | 183,000 | 2.5 |

[r]Fina 8573 (ATOFINA, Deer Park, TX) - a propylene/ethylene copolymer containing 4 wt % ethylene.

It is evident from the test results in Table 2 that the sample containing $C_2$–$C_4$ copolymer (DP8510) has a higher OTR value than the sample containing CC3 copolymer (Fina 8573). Moreover, the higher OTR value is obtained using lesser amount of a copolymer.

It is remarkable that using $C_2$–$C_4$ copolymer instead of $C_2$–$C_3$ copolymer, the higher OTR value, a high tensile modulus, and a low haze can be achieved using less of a copolymer, a more expensive component of a blend with high modulus polypropylene.

Example 3

A series of polymer blends containing high modulus, isotactic polypropylene homopolymer BP Amoco Accpro 9117 with 1-butene/ethylene copolymers were prepared as indicated above using the laboratory equipment. The 1-butene/ethylene copolymer was Basell DP8510, which contained 3.5 wt % ethylene. This copolymer has MI of 45 dg/minutes. Relevant test data are presented in Table 3. The data of the measured values are represented in the form of average values. Standard deviations are shown in parenthesis.

TABLE 3

A Blend of a $C_2/C_4$ Copolymer with a High Modulus Polypropylene Amoco Accpro 9117[h]/Basell DP8510[b] (6 3.5 wt % ethylene)

| Accpro 9117[h]; wt. % | DP8510[b] wt. % | Orient. Temp.[c]; °C. | OTR[d]; cc/100 sq. in./day/atm | Tensile Modulus[e]; psi | Haze[f]; % |
|---|---|---|---|---|---|
| 75 | 25 | 120 | 223.9 (17.6) | 287446 (8367) | 0.43 (0.02) |
| 90 | 10 | 130 | 125.4 (1.1) | 387057 (27537) | 0.37 (0.04) |
| 100 | 0 | 145 | 92.2 (4.5) | 482413 (28464) | 0.69 (0.05) |

[h]BP Amoco Accpro 9117 (Alpharetta, GA) - a high isotactic homopolymer PP, MFR = 2.1 dg/min A 75/25 blend of the high isotactic homopolymer PP (Amoco Accpro 9117) with the 1-butene/ethylene copolymer containing 3.5 wt % ethylene (Basell DP8510) yielded a film with an OTR of about 224 cc/100 sq.in./day/atm for a film 1 mil thick and a very low haze. The tensile modulus of the film is about 290,000 psi. This is to be compared with the OTR and the tensile modulus of the film made from a prior art 75/25 blend of the propylene/ethylene copolymer containing 4 wt % ethylene (Fina 8573) and the high tacticity polypropylene homopolymer (Amoco Accpro 9117) which has an OTR at 1 mil thickness of 190 cc/100 sq. in./day and a tensile modulus of about 240,000 psi. Thus, in the blend of the high tacticity polypropylene homopolymer (Accpro 9117) with the 1-butene/ethylene copolymer containing 3.5 wt % ethylene (Basell DP8510) both the film OTR values and modulus are higher than that of the prior art structure.

Example 4

Additional blends containing the high tacticity polypropylene homopolymer (Amoco Accpro 9117) were prepared as indicated above using the laboratory equipment, except that the 1-butene/ethylene copolymer was Basell DP8220, which contains 2.5 wt % ethylene. This copolymer has MI of 2.0 dg/minutes. The data of the measured values are represented in the form of average values; standard deviations are shown in parenthesis.

TABLE 4

A Blend of a $C_2/C_4$ Copolymer with a High Modulus Polypropylene Amoco Accpro 9117[h]/Basell DP8220[j] (2.5 wt % ethylene)

| Accpro 9117[h]; wt. % | DP8220[l] wt. % | Orient Temp.[c]; °C. | OTR[d]: cc/100 sq. in./day/atm | Tensile Modulus[e]; psi | Haze[f]; % |
|---|---|---|---|---|---|
| 50 | 50 | 118 | 335.4 (7.6) | 185084 (9433) | 3.98 (0.06) |
| 60 | 40 | 121 | 258.1 (3.8) | 241925 (1600) | 2.91 (0.25) |
| 75 | 25 | 121 | 183.5 (3.7) | 304825 (13721) | 2.17 (0.04) |
| 90 | 10 | 138 | 130.8 (3.2) | 395043 (14536) | 1.24 (0.09) |
| 100 | 0 | 145 | 110.6 (18.2) | 470132 (30695) | 0.53 (0.05) |

[l]Basell DP8220 (Wilmington, DE) - a 1-butene/ethylene copolymer containing 2.5 wt % ethylene; MI = 2.0 dg/minute.

As shown in Table 4, a film made from a 75/25 blend of a high tacticity polypropylene homopolymer (Accpro 9117) and a 1-butene/ethylene copolymer containing 2.5 wt % ethylene (DP8220) exhibits an OTR of about 184 cc/100 atm, comparable to that observed with the prior art film made from the blend Fina 8573/Accpro 9117 described above as having an OTR at 1 mil thickness of 190 cc/100 sq. in./day and a tensile modulus of about 240,000 psi.

However, the tensile modulus of the film of this invention formed from the blend 75/25 Accpro 9117/DP8220, as presented in Table 4, is about 305,000 psi, which is about 20–25% higher than that observed for the prior art film made from the Fina 8573/Accpro 9117 blend. On the other hand, a 60/40 Accpro 9117/DP8220 blend yields a film having the same modulus as the film having a 75/25 Fina 8573/Accpro 9117 blend but with a higher OTR value of about 260 cc/100 sq.in./day/atm measured for a 1 mil thick film. Also, in both of the aforementioned films of this invention, the haze was low. Thus, films based on blends of the high tacticity polypropylene homopolymer (Accpro 9117) with the 1-butene/ethylene copolymer containing 2.5 wt % ethylene also offer advantages compared to the prior art films based on the blends of a propylene/ethylene copolymer with a polypropylene homopolymer.

Example 5

Another series of polymer blends containing the addition of low density polyethylene (LDPE) to a blend containing the high modulus, isotactic polypropylene homopolymer (BP Amoco Accpro 9117) and the 1-butene/ethylene copolymer (Basell DP8510) containing 3.5 wt % ethylene were prepared as indicated above using the laboratory equipment. In this embodiment, EXCEED 350D60 was used, which is a metallocene linear low-density polyethylene (mLLDPE) resin which is a hexene copolymer produced using Exxon-Mobil Chemical's EXXPOL® technology. The density of the copolymer is about 0.917 g/cc.

Relevant test data are presented in Table 5. The data of the measured values are represented in the form of average values. Standard deviations are shown in parenthesis.

TABLE 5

A Blend of a $C_2/C_4$ Copolymer with a High Modulus Polypropylene and mLLDPE Amoco Accpro 9117[h]/Basell DP8510[b]/ Exxon EXCEED 350D60[j]

| Accpro 9117[h]; wt. % | DP8510[b] wt. % | 350D60[l] wt. % | Orient Temp.[c]; °C. | OTR[d]; cc/100 sq. in./ day/atm | Tensile Modulus[e]; psi | Haze[f]; % |
|---|---|---|---|---|---|---|
| 55 | 25 | 20 | 105 | 258.6 (7.5) | 176622 (21879) | 1.41 (0.31) |
| 65 | 25 | 10 | 110 | 213.5 (5.2) | 224613 (14829) | 2.69 (0.22) |
| 70 | 25 | 5 | 120 | 221.9 (2.9) | 214640 (4989) | 4.07 (0.14) |
| 75 | 25 | 0 | 120 | 187.4 (2.1) | 257368 (14810) | 0.35 (0.03) |

[l]EXCEED 350D60-is a metallocene linear low-density polyethylene (mLLDPE) resin produced using ExxonMobil Chemical's EXXPOL® technology; density being about 0.917 g/cc.

The addition of mLLDPE increases the OTR even further than that of films of the Examples above.

Further, the blend 65125/10 Accpro 9117[7]/DP8510[b]/EXCEED 350D60[j] was tested at different orientation temperatures as shown in Table 6 below to ascertain an optimum orientation temperature for obtaining the desired balance of tensile modulus, OTR, and haze.

TABLE 6

65/25/10 Accpro 9117[h]/DP8510[b]/EXCEED 350D60[l] at Different Orientation Temperatures.

| Orient. Temp.[c]; °C. | OTR[d]; cc/100 sq. in./day/atm | Tensile Modulus[e]; psi | Haze[f]; % |
|---|---|---|---|
| 105 | 220.5 (5.0) | 241895 (5843) | 2.08 (0.08) |
| 110 | 225.8 (2.3) | 236962 (5877) | 2.80 (0.10) |
| 115 | 242.9 (1.5) | 229604 (11494) | 6.23 (0.04) |

As shown in Table 6, as the orientation temperature increases, both the haze and the OTR increase while the tensile modulus decreases. This shows that there is an optimum orientation temperature for obtaining the desired balance of OTR, modulus, and optical properties.

Example 6

A series of polymer blends containing high modulus, isotactic polypropylene homopolymer BP Amoco Accpro 9117 with 1-butene/ethylene copolymers were made by the method described earlier using the laboratory equipment. The 1-butene/ethylene copolymer was Basell DP8310, which contained 3.5 wt % ethylene. This copolymer has MI of 3 dg/minute. Test data are presented in Table 7 below. Average values are presented with standard deviations being reported in parentheses.

TABLE 7

A Blend of a $C_2/C_4$ Copolymer with a High Modulus Polypropylene Amoco Accpro 9117[h]/Basell DP8310[k] (6 3.5 wt % ethylene)

| Accpro 9117[h] wt. % | DP8310[k] wt. % | Orient. Temp.[c]; °C. | OTR[d]; cc/100 sq. in./day/atm | Tensile Modulus[e]; psi | Haze[f]; % |
|---|---|---|---|---|---|
| 90 | 10 | 140 | 132.6 (2.6) | 366863 (11291) | 0.41 (0.02) |
| 75 | 25 | 130 | 218.6 (5.0) | 282713 (4601) | 0.92 (0.04) |
| 60 | 40 | 130 | 325.2 (0.6) | 192200 (5429) | 1.42 (0.04) |

[k]Basell DP8310 (Wilmington, DE) - 1-butene/ethylene copolymer containing 6 3.5 wt % ethylene, MI = 3.0 dg/minute.

A 75/25 blend of the high isotactic homopolymer PP (Amoco Accpro 9117) with the 1-butene/ethylene copolymer containing 3.5 wt % ethylene (Basell DP83 10) yielded a film with an OTR of about 218.6 cc/100 sq.in./day/atm for a film 1 mil thick and a low haze of 0.92%. The tensile modulus of the film is about 283,000 psi. These values are to be compared with the OTR and the tensile modulus of the film made from the prior art 75/25 blend of the propylene/ethylene copolymer containing 4 wt % ethylene (Fina 8573) and the high tacticity polypropylene homopolymer (Amoco Accpro 9117) which has an OTR at 1 mil thickness of 190 cc/100 sq. in./day and a tensile modulus of about 240,000 psi. Accordingly, in the blend of the high tacticity polypropylene homopolymer (Accpro 9117) with the 1-butene/ethylene copolymer containing 3.5 wt % ethylene (Basell DP8310) both the film OTR values and modulus are higher then that of the prior art film.

Example 7

A comparative example demonstrating blends of a low modulus isotactic PP homopolymer such as AtoFina 3371 (DeerPark, Tex.) with the 1-butene/ethylene copolymer Basell DP8220, which contained 2.5 wt % ethylene were prepared as above using the laboratory equipment. Relevant test data are presented in Table B. The data of the measured values are represented in the form of average values, standard deviations are shown in parenthesis.

TABLE 8

A Blend of a $C_2/C_4$ Copolymer with a Low Modulus Polypropylene AtoFina 3371[l]/Basell DP8220[j]

| AtoFina[l] 3371; wt. % | DP8220[j] wt. % | Orient. Temp.[c]; °C. | OTR[d]; cc/100 sq. in./day/atm | Tensile Modulus[e]; psi | Haze[f]; % |
|---|---|---|---|---|---|
| 60 | 40 | 110 | 240.8 (3.3) | 150306 (9438) | 3.61 (0.10) |
| 75 | 25 | 115 | 172.3 (4.0) | 227945 (9773) | 2.81 (0.09) |
| 90 | 10 | 130 | 140.4 (2.8) | 305413 (14536) | 1.63 (0.05) |
| 100 | 0 | 133 | 112.3 (1.0) | 387306 (15723) | 0.41 (0.03) |

[l]AtoFina 3371 (DeerPark, TX)-low modulus isotactic homopolymer PP, MFR = 2.8 dg/minutes.

Comparing these data with the data from Table 4 demonstrating the blend Amoco Accpro 9117/Basell DP8220 containing 2.5 wt % ethylene (a high modulus polypropylene blend), ft is evident that with the use of a lower modulus polymer (e.g., AtoFina 3371), the tensile modulus of the resulting blend containing a lower modulus polypropylene is lower than that of a blend containing a high modulus polypropylene at comparable OTR values.

Example 8

A series of polymer blends containing a blend of a high modulus polypropylene (FF035C) with a $C_2/C_3$ copolymer (Fina 8573 (ATOFINA, Deer Park, Tex.) containing 4 wt % ethylene; and Fina 9470 (ATOFINA, Deer Park, Tex.) containing 5.5 wt % ethylene) were prepared as in Example 1 using the laboratory equipment and contemporaneously with a series of polymer blends containing a blend of a high modulus polypropylene (FF035C) with a $C_2/C_4$ copolymer (Basell DP8510 (Wilmington, Del.) containing 3.5 wt % ethylene; and Basell DP8340 (Wilmington, Del.) containing 0.5 wt % ethylene). Films formed from the above blends were oriented at orientation temperatures of 130° C. and 138° C.

Relevant test data are presented in Tables 9 and 10.

TABLE 9

A Blend of a $C_2/C_3$ Copolymer with a High Modulus Polypropylene

| Homo-Polymer wt % FF035 C[a] | Co-polymer wt % | OTR[l] cc/100 sq.in./day/atm | OTR[m] cc/100 sq.in./day/atm | Tensile Modulus[n] Kpsi | Tensile Modulus[o] Kpsi | Haze[p] % | Haze[q] % |
|---|---|---|---|---|---|---|---|
|  | Fina 8573[r] |  |  |  |  |  |  |
| 25 | 75 | 138 | 156 | 227 | 189 | 0.34 | 0.49 |
| 40 | 60 | 131 | 138 | 272 | 231 | 0.42 | 0.44 |
| 60 | 40 | 107 | 117 | 280 | 287 | 0.43 | 0.42 |
|  | Fina 9470[s] |  |  |  |  |  |  |
| 25 | 75 | 180 | 189 | 151 | 169 | 0.46 | 0.68 |
| 60 | 40 | 124 | 122 | 257 | 266 | 0.42 | 0.44 |

[l–m]The OTR values were measured for a 1 mil thick film oriented at orientation temperatures of 130° C. and 138° C. respectively;
[n–o]The Tensile Modulus values were measured for a 1 mil thick film oriented at orientation temperatures of 130° C. and 138° C. respectively;

TABLE 9-continued

A Blend of a $C_2/C_3$ Copolymer with a High Modulus Polypropylene

| Homo-Polymer wt % FF035 C[a] | Co-polymer wt % | OTR[l] cc/100 sq.in./day/atm | OTR[m] cc/100 sq.in./day/atm | Tensile Modulus[n] Kpsi | Tensile Modulus[o] Kpsi | Haze[p] % | Haze[q] % |
|---|---|---|---|---|---|---|---|

[p–q]The Haze values were measured for a 1 mil thick film oriented at orientation temperatures of 130° C. and 138° C. respectively;
[r]Fina 8573 (ATOFINA, Deer Park, TX) - a propylene/ethylene copolymer containing 4 wt % ethylene;
[s]Fina 9470 (ATOFINA, Deer Park, TX) - a propylene/ethylene copolymer containing 5.5 wt % ethylene.

TABLE 10

A Blend of a $C_2/C_4$ Copolymer with a High Modulus Polypropylene

| Homo-Polymer wt % FF035 C[a] | Co-polymer wt % | OTR[l] cc/100 sq.in./day/atm | OTR[m] cc/100 sq.in./day/atm | Tensile Modulus[n] Kpsi | Tensile Modulus[o] Kpsi | Haze[p] % | Haze[q] % |
|---|---|---|---|---|---|---|---|
| | Basell DP8510[b] | | | | | | |
| 40 | 60 | 298 | 317 | 128 | 114 | 14.9 | 15.78 |
| 60 | 40 | 211 | 215 | 147 | 183 | 2.72 | 2.5 |
| 75 | 25 | 146 | 148 | 248 | 256 | 2.79 | 2.95 |
| | Basell DP8340[t] | | | | | | |
| 40 | 60 | 299 | 297 | 120 | 119 | 19.66 | 17.08 |
| 60 | 40 | 214 | 211 | 201 | 181 | 3.83 | 2.75 |
| 75 | 25 | 147 | 190 | 243 | 236 | 2.55 | 2.39 |

[b]Basell DP8510 (Wilmington, DE) - a 1-butene/ethylene copolymer containing 3.5 wt % ethylene, MI of 45 dg/minute;
[t]Basell DP8340 (Wilmington, DE) - a 1-butene/ethylene copolymer containing 0.5 wt % ethylene, MI of 4.0 dg/minute.

Comparing data in Table 9 and 10, it is evident that films made from a blend of a $C_2/C_4$ copolymer (Basell DP8510 and Basell DP8340) with a high modulus polypropylene (FF035C) has a higher OTR and comparable tensile modulus and haze than films made from a blend of a $C_2/C_3$ copolymer (Fina 8573 and Fina 9470) with a high modulus polypropylene (FF035C).

Further, comparing the data in Table 1 with the data in Table 10 relating to the blend of FF035C and Basell DP8510, is observed that processing condition, e.g., the orientation temperature are important factors which can further influence the OTR, tensile modulus and haze values. The preferred orientation temperature is at least 130° C., and more preferred is from about 130° C. to about 150° C.

Thus, in the present invention, films based on the 1-butene/ethylene copolymer blends offer a way to obtain films having a higher modulus, a low haze and the same or better OTR as compared to presently used films. This should allow for easier running of these films on a standard OPP equipment.

In another preferred embodiment of the present invention, if the desired tensile modulus is equal to the one presently obtained in prior art films, but a higher OTR is desired, the 1-butene/ethylene copolymer blends of the present invention offer a different blend composition than disclosed before, wherein the resulting film also maintains a low haze value.

As demonstrated in Examples above, the films of the present invention are more economical wherein the films' parameters such as higher OTR values and comparable tensile modulus and haze values can be achieved by employing less of a copolymer (which is the most expensive component) in a blend with high modulus polypropylene. This can be achieved by using a 1-butene/ethylene copolymer instead of a propylene/ethylene copolymer.

What is claimed is:

1. A biaxially oriented, transparent, multilayer packaging film, said film including a core layer and opposed, functional skin layers, said core layer including a blend comprising:
   a) a high modulus polypropylene having an isotactic index of at least about 92% and being present in a range greater than 40% to less 90% by weight of the blend and
   b) a 1-butene/ethylene copolymer in a range greater than 10% to less than 60% by weight of the blend, wherein the 1-butene/ethylene copolymer comprises about 0.5% to about 10 wt % of an ethylene; said core layer being biaxially oriented at a temperature resulting in said core layer having an oxygen transmission rate of at least about 200 cc/100 sq. in./day/atmosphere (3077 cc/sq. m./24 hr./atmosphere), a tensile modulus in at least one direction of at least about 160,000 psi (1.103 GPa) and a haze value of no greater than about 3% and wherein the oxygen transmission rate, the tensile modulus and the haze value are measured at a thickness of about 1 mil (25 µm); and
   c) said functional skin layers being substantially thinner than said core layer.

2. The packaging film according to claim 1, wherein the tensile modulus of the cover layer is at least about 180,000 psi (1.241 GPa).

3. The packaging film according to claim 1, further including from 0 to about 20% by weight of a polyethylene in the polyolefin blend in the core.

4. The packaging film according to claim 3, wherein the polyethylene is a metallocene linear low-density polyethylene having a density from about 0.9 to about 0.92 g/cc.

5. The packaging film according to claim 3, wherein the polyolefin blend of the core layer comprises:
   a) about 65% by weight of the high modulus, isotactic polypropylene;
   b) about 25% by weight of the 1-butene/ethylene copolymer, wherein the melt index of the 1-butene/ethylene copolymer is about 45 dg/min, and wherein the 1-butene/ethylene copolymer comprises about 3.5% by weight of ethylene; and
   c) about 10% by weight of the polyethylene, wherein the polyethylene is a metallocene linear low-density polyethylene having a density of about 0.917 g/cc.

6. The packaging film according to claim 1, wherein the isotactic index is about 93% to about 98%.

7. The packaging film according to claim 1, wherein the polypropylene has a melt flow rate of about 1 to about 10 dg/min.

8. The packaging film according to claim 1, wherein the polypropylene has a melt flow rate of about 2 to about 3.5 dg/min.

9. The packaging film according to claim 1, wherein the polypropylene is in a range greater than 40% to 75% by weight of the blend.

10. The packaging film according to claim 1, wherein the polypropylene is about 60 to less than 75% by weight of the blend.

11. The packaging film according to claim 1, wherein the melt index of the 1-butene/ethylene copolymer is about 2 to about 45 dg/min.

12. The packaging film according to claim 1, wherein at least one of said functional skin layers is selected from the group consisting of a sealant layer, a print layer, and a slip layer.

13. The packaging film according to claim 1, wherein the polyolefin blend in the core layer comprises:
   a) about 75% by weight of the high modulus, isotactic polypropylene; and
   b) about 25% by weight of the 1-butene/ethylene copolymer, wherein the melt index of the 1-butene/ethylene copolymer is about 45 dg/min, and wherein the 1-butene/ethylene copolymer comprises about 3.5% by weight of ethylene.

14. The packaging film according to claim 1, wherein the polyolefin blend of the core layer comprises:
   a) about 60% by weight of the high modulus, isotactic polypropylene; and
   b) about 40% by weight of the 1-butene/ethylene copolymer, wherein the melt index of the 1-butene/ethylene copolymer is about 45 dg/min, and wherein the 1-butene/ethylene copolymer comprises about 3.5% by weight of ethylene.

15. The packaging film according to claim 1, wherein the polyolefin blend of the core layer comprises:
   a) about 60% by weight of the high modulus, isotactic polypropylene; and
   b) about 40% by weight of the 1-butene/ethylene copolymer, wherein the 1-butene/ethylene copolymer comprises about 0.5% by weight of ethylene.

16. The packaging film according to claim 1, wherein the film is oriented at an orientation temperature of at least 130° C.

* * * * *